| United States Patent [19] | [11] Patent Number: 4,651,670 |
|---|---|
| Silverwater | [45] Date of Patent: Mar. 24, 1987 |

[54] PRESSURE INDICATING DEVICE

[75] Inventor: Bernard Silverwater, Plainview, N.Y.

[73] Assignee: Pall Corporation, Glen Cove, N.Y.

[21] Appl. No.: 781,222

[22] Filed: Sep. 27, 1985

[51] Int. Cl.[4] .............................................. G01L 19/12
[52] U.S. Cl. ................................... 116/268; 116/267;
116/DIG. 42; 210/90
[58] Field of Search ...................... 116/34 R, 204, 266,
116/267, 268, 272, DIG. 25, DIG. 42; 73/38,
744, 146.8, DIG. 5; 200/82 E; 210/90

[56] References Cited

U.S. PATENT DOCUMENTS

| 1,204,013 | 11/1916 | Hanni ...................................... 73/744 |
| 1,444,152 | 2/1923 | Hahn ...................................... 116/34 R |
| 2,671,834 | 3/1954 | Kmiecik ................................... 335/207 |
| 2,942,572 | 6/1960 | Pall ......................................... 116/267 |
| 3,128,743 | 7/1964 | Whiting ................................... 116/267 |
| 3,140,690 | 7/1964 | Siebel ...................................... 116/267 |
| 3,212,471 | 10/1965 | Willis ...................................... 210/90 |
| 3,291,307 | 12/1966 | Rosaen .................................... 210/90 |
| 3,335,694 | 8/1967 | Dwyer et al. ........................... 210/90 |
| 3,512,497 | 5/1970 | Falke ...................................... 116/268 |
| 3,815,542 | 6/1974 | Cooper .................................... 116/221 |
| 3,974,795 | 8/1976 | Crisp, Jr. ................................ 116/267 |
| 4,574,728 | 3/1986 | Barnard .................................. 116/267 |

FOREIGN PATENT DOCUMENTS

| 893249 | 2/1972 | Canada ................................... 116/267 |
| 398850 | 3/1974 | U.S.S.R. ................................. 73/38 |

Primary Examiner—Charles Frankfort
Assistant Examiner—W. Morris Worth
Attorney, Agent, or Firm—Leydig, Voit & Mayer

[57] ABSTRACT

A device for indicating differential pressures between first and second pressure sources comprising a housing with a bore and a piston member slidably disposed within the bore and dividing the bore into first and second chambers. The piston member includes a permanent magnet and the housing includes ducts for connecting the first pressure source to the first chamber and the second pressure source to the second chamber whereby the piston member is displaceably responsive to differences in pressure between the first and second pressure sources. The device further comprises indicators in cooperative arrangement with the piston member for indicating at least first and second predetermined differential pressure levels respectively corresponding to respective displacements of the piston member within the bore. The indicators are magnetically coupled to the piston permanent magnet such that they move from non-signalling to signalling positions in response to the respective displacements of the piston member.

28 Claims, 10 Drawing Figures

PRESSURE INDICATING DEVICE

FIELD OF THE INVENTION

The present invention relates to pressure indicating devices and in particular to devices for indicating the pressure differential between two pressure sources.

BACKGROUND OF THE INVENTION

In systems where a fluid under pressure flows from one point to another, it is frequently desirable to include a device for indicating the difference in fluid pressure at two discrete points. Such differential pressure sensing devices are widely used in industry and in the filter industry in particular. These devices provide a means for indicating the impedence of the flow of fluid through the system and can, for example, sense differential pressures across a pneumatic or hydraulic filter element such as occur when the element becomes clogged, and thereupon indicate that the filter element may require replacement or cleaning. Thus, it may be desirable to install such a device to monitor this difference in pressure and to provide an indication of when the difference exceeds some predetermined unacceptably high value corresponding to an unacceptably clogged condition of the filter.

Devices for providing such an indication are well known in the art, as described, for example, in U.S. Pat. Nos. 2,942,572, 3,140,690 and 3,815,542. While the devices described in these patents have proven reliable and effective, they are limited to indicating a pressure difference greater than a single predetermined value.

In many situations, indications of more than one predetermined pressure differential are highly desirable. For example, in the previously mentioned filtering system, it may be important to distinguish between the situation in which the filter is only partially clogged, although sufficiently blocked to require replacement during the next routine maintenance examination, and the situation in which the filter is completely clogged and requires immediate replacement on an emergency basis. This would require a first indication when the difference between the pressures at the upstream and downstream sides of the filter reaches a first level corresponding to the partially clogged condition, and a second indication when the difference between the pressures reaches a second higher level corresponding to the totally clogged condition.

SUMMARY OF THE INVENTION

A general object of the present invention is to provide an improved device for indicating differences in pressure. More specific objects include providing a device which indicates at least two predetermined differences in pressure and which reliably and effectively provides those indications. The present invention may be embodied by a device which indicates differences in pressure between a first source of pressure and a second source of pressure and which comprises a housing having a bore and a piston mounted for relative movement therein. The piston, which includes at least one magnetic element, divides the bore into first and second pressure chambers on either side of the piston. The housing includes structures, such as ducts, for connecting the first pressure source to the first chamber and the second pressure source to the second chamber. The pressure indicating device also comprises a spring associated with the piston for opposing movement of the piston within the bore through first and second displacements corresponding to predetermined pressure levels. As the pressure within the first chamber increases with respect to the pressure in the second chamber, the force acting on the piston due to the first pressure source will overcome the force of the spring and the force acting on the piston due to the second pressure source, and the piston will be displaced within the bore. The pressure indicating device further comprises a signalling mechanism which cooperates with the piston and indicates at least first and second differences in pressure, which respectively correspond to the first and second displacements of the piston. This signalling mechanism includes a first indicator which is magnetically coupled to the piston for moving from a non-signalling to a signalling position in response to the first displacement of the piston member and, further, includes a second indicator magnetically coupled to the piston for moving from a non-signalling to a signalling position in response to the second displacement of the piston member. Accordingly, the present invention provides a pressure indicating device which is capable of indicating at least two differences in pressure and therefore is more versatile and convenient than many previous devices.

In accordance with a particularly advantageous feature of the invention, the pressure indicating device embodying the invention may include first and second indicators, each attached to a magnetic element. The first and second magnetic elements are moved into signalling positions in response to the first and second displacements, respectively, of the piston. This feature of the invention provides an especially reliable and effective pressure indicating device.

DESCRIPTION OF PREFERRED EMBODIMENTS

While a pressure indicating device constructed and operated according to the present invention may be variously embodied, it is preferably embodied as a separate component of a hydraulic or pneumatic system. For example, in FIGS. 1–4, a first exemplary pressure indicating device 100 is shown as a discrete component mounted to a manifold 90 and extending into a bore 91. First and second ducts 92, 93 tap the manifold bore 91 at spaced locations with the first duct 92 serving as a source of fluid at one pressure and the second duct 93 serving as a source of fluid at a second, generally lower pressure. The illustrated manifold 90 with its bore 91 and ducts 92, 93 is representative of a variety of fluid systems. However, in one contemplated application of the invention, the pressure duct 92 channels fluid from the upstream side of a filter (not shown) while the low pressure duct 93 channels fluid from the downstream side of the filter and the pressure indicating device 100 indicates the pressure drop across the filter.

Figure 1:
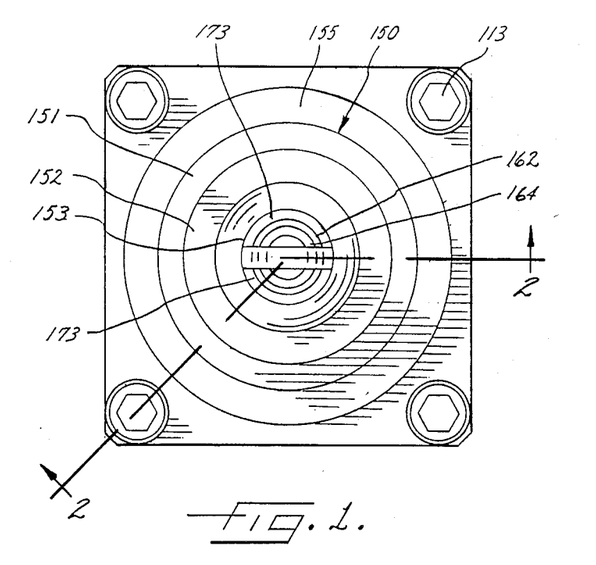
FIG. 1 is a plan view of a first exemplary pressure indicating device embodying the present invention.
Figure 2:
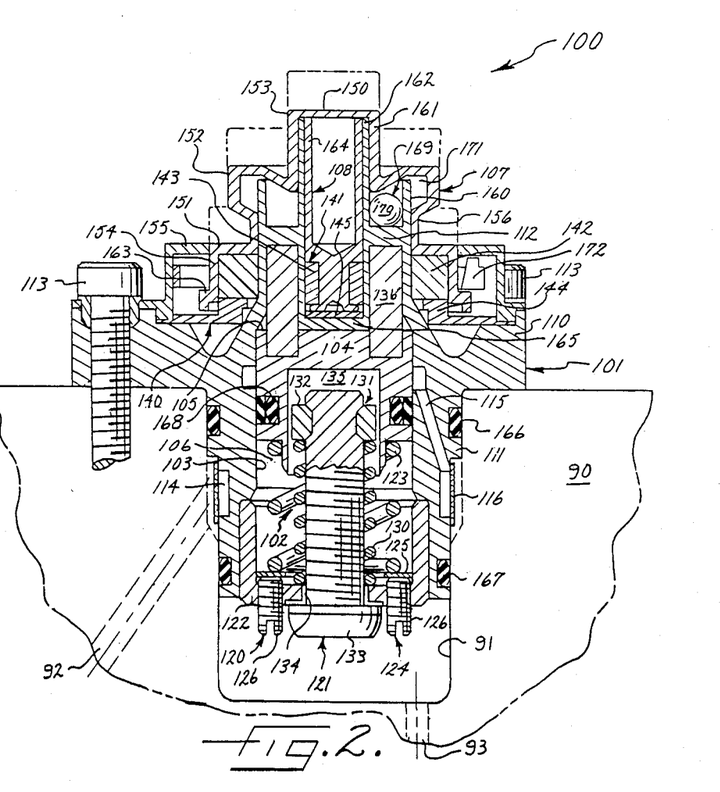
FIG. 2 is a sectional side view of the pressure indicating device of FIG. 1 as viewed along lines 2—2 showing the first and second signalling mechanisms in the non-signalling position.

As shown in FIGS. 1 and 2, the first exemplary pressure indicating device 100 generally comprises a housing 101 and a piston assembly 102 disposed within a central bore 103 in the housing 101. The piston assembly 102 includes a piston 104 which divides the housing bore 103 into a high pressure chamber 105 and a low pressure chamber 106 and is displaced along the housing bore 103 in response to differences in pressures within the chambers 105, 106. In accordance with one aspect of the invention, the device 100 further comprises first and second signalling mechanisms 107, 108 which are magnetically coupled to the piston assembly 102 for indicating when the differential pressure exceeds first and second predetermined levels, respectively.

The housing 101 includes a plate portion 110, a cylindrical projection 111 which extends inwardly into the manifold bore 91, and a cylindrical projection 112 which extends outwardly from the manifold 90. Threaded connectors 113 extending through the plate portion 110 attach the pressure indicating device 100 to the manifold 90. However, the pressure indicating device 100 may be attached to the manifold 90 by any suitable means, including a threaded connection between the inward cylindrical projection 111 and the manifold 90 within the manifold bore 91.

The inward cylindrical projection 111 has a circumferential recess 114 which communicates with the pressure duct 92. The circumferential recess 114 also communicates with the high pressure chamber 105 of the housing bore 103 via a passageway 115, allowing the high pressure fluid to flow from the duct 92 into the high pressure chamber 105. A suitable filter 116 may be disposed between the high pressure duct 92 and the circumferential recess 114 to prevent particulates above a particular size and carried by the fluid from entering the housing bore 103.

The piston assembly 102 includes, in addition to the piston 104, a spring arrangement comprising a primary spring assembly 120 and a secondary spring assembly 121, each coaxially disposed within the housing bore 103. The piston assembly further includes a retainer 122.

The retainer 122 is fixedly mounted to the open end of the inward cylindrical projection 111 and serves to confine the primary and secondary spring assemblies 120, 121.

The primary spring assembly 120 includes a primary coil spring 123 and a compression adjusting mechanism 124. The primary coil spring 123 is disposed between the piston 104 and the compression adjusting mechanism 124. The compression adjusting mechanism 124 comprises an annular washer 125 and a plurality of set screws 126 threaded through the retainer 122. To adjust the compression of the primary coil spring 123, the set screws 126 may be turned into or out of the retainer 122, varying the distance between the retainer 122 and the annular washer 125 and, therefore, the length and compression of the primary coil spring 123.

The secondary spring assembly 121 includes a secondary coil spring 130 which is disposed coaxially within the primary coil spring 123 and a stop arrangement 131 which comprises a nut 132 threaded to the shaft of a bolt 133. The shaft of the bolt 133 extends through a central aperture 134 in the retainer 122. The aperture 134 is sufficiently large to allow the bolt 133 to turn freely within, or slide through, the retainer 122. The secondary coil spring 130, which extends coaxially along the shaft of the bolt 133 between the retainer 122 and the nut 132, biases the stop arrangement 131 toward the piston 104. To adjust the compression of the secondary coil spring 130, the bolt 133 may be turned in either direction within the aperture 134 of the retainer 122. Since the secondary coil spring 130 resists the torque of the turning bolt 133, the nut 132 will be threaded inwardly or outwardly along the shaft of the bolt 133, varying the length and compression of the secondary coil spring 130.

In the preferred embodiment, with both the stop arrangement 131 and the piston 104 fully biased outwardly within the bore 103, toward the cylindrical projection 112, a gap 135 exists between the piston 104 and the end of the shaft of the bolt 133. Consequently, as the piston 104 is displaced inwardly along the housing bore 103 by a differential pressure between the high and low pressure chambers 105, 106, the movement of the piston 104 will be opposed by the primary coil spring 123 through the distance of the gap 135. However, after the piston 104 contacts the end of the shaft of the bolt 133, further inward movement of the piston 104 will be opposed by both the primary and secondary coil springs 123, 130. Varying the compression of the primary and secondary coil springs 123, 130 does not affect the distance of the gap 135.

The piston assembly 102 also includes a cylindrical magnetic element 136 which is fixedly and coaxially mounted to the piston 104, projecting outwardly from the head of the piston 104. When the piston 104 is fully outwardly displaced within the housing bore 103, the magnetic element 136, which has a smaller diameter than the piston 104 and an annular cross section, is disposed in a correspondingly shaped extension of the high pressure chamber 105 in the outward cylindrical projection 112 of the housing 101. The field within the magnetic element 136 is generally aligned axially with, for example, the N pole furthest from the piston 104.

The first and second signalling mechanisms 107, 108 are each magnetically coupled through the housing 101 to the magnetic element 136 of the piston assembly 102. In accordance with one aspect of the invention, the first signalling mechanism 107 includes an annular magnetic assembly 140 coaxially disposed around the magnetic element 136 of the piston assembly 102, while the second signalling mechanism 108 includes a cylindrical magnetic assembly 141 coaxially disposed within the magnetic element 136, as shown in FIG. 2. Each magnetic assembly 140, 141 comprises a magnetic element 142, 143 which has its field aligned and poles disposed in the same fashion as the magnetic element 136 of the piston assembly 102 and further comprises a separate magnetic enhancer 144, 145 which dampens the sensitivity of the response of the magnetic element 142, 143 to movement of the magnetic element 136 of the piston assembly 102. In the preferred embodiment, all magnetic elements 136, 142, 143 are permanent magnets fashioned, for example, from rare earth magnets. Further, both magnetic enhancers 144, 145 are fashioned from a magnetic material such as stainless steel AISI 416. However, the magnetic elements 136, 142, 143 may also be fashioned from any suitable permanently magnetic material or the magnetic enhancers 144, 145, may be fashioned from any suitable magnetic material or permanently magnetic material without departing from the scope of the invention.

In addition to the first magnetic assembly 140, the first signalling mechanism 107 also includes a cap-like first indicator 150 mounted about the outward cylindrical projection 112 of the housing 101. This first indicator 150 comprises three generally cylindrical tiers 151, 152, 153. The side wall 154 of the first tier 151 is anodized bright orange and is disposed within a circular aperture in a cover 155 attached to the housing 101 by the threaded connectors 113; the side wall 156 of the second tier 152 is disposed about an interior cylindrical wall 160 of the outward cylindrical projection 112; and the side wall 161 of the third tier 153 is disposed about an interior cylindrical wall 162 of the outward cylindrical projection 112. Further, the first magnetic element 142 is disposed within the side wall 154 of the first tier 151 fixedly attached to the first indicator 150 while the first magnetic enhancer 144 extends from the outward cylindrical projection 112 adjacent to the first magnetic element 142 and then to the cover 155 and is clamped at its external edge between the cover 155 and the plate chamber 110 of the housing 101. Thus, the first indicator 150 with the first magnetic element 142 may slide along the cylindrical walls 160, 162 of the outward cylindrical projection 112 between an outer limit defined by the intersection of the cover 155 and a flange 163 on the side wall 154 of the first tier 151 and an inner limit defined by the intersection of the first magnetic element 142 and the first magnetic enhancer 144.

The second signalling mechanism 108 includes, in addition to the second magnetic assembly 141, a hollow cylindrical indicator 164 disposed coaxially within and adjacent the interior cylindrical wall 162 of the outward cylindrical projection 112. This second indicator 164 is fixedly attached to the second magnetic element 143 and extends from the second magnetic enhancer 145, which is fixedly attached to a separator wall 165 of the housing 101, to the top of the interior cylindrical wall 162 of the outward cylindrical projection 112. With the first indicator 150 at its inner limit, the second indicator 164 is confined within the interior cylindrical wall 162. However, with the first indicator 150 at its outer limit, the second indicator 164 may slide outward to an outer limit defined by the intersection of the second indicator 164 and third tier 153 of the first indicator 150. The second indicator 164 may then be observed in the actuated position thru openings 173 shown in FIG. 1.

In the preferred mode of operation, fluid from the high pressure duct 92 passes through the filter 116, into the circumferential recess 114, along the passageway 115, and into the pressure chamber 105. Meanwhile, fluid from the low pressure duct 93 fills the inward end of the manifold bore 91 and passes under the head of the bolt 133, through the aperture 134 in the retainer 122, and into the pressure chamber 106. Circumferential seals 166, 167 disposed between the housing 101 and the manifold 90 above and below the circumferential recess 114 prevent leakage of the high pressure fluid from the manifold 90 or bypass from the high pressure duct 92 to the inward end of the manifold bore 91. Similarly, a circumferential ring and seal arrangement 168 between the piston 104 and housing 101 prevents bypass from the pressure chamber 105 to the pressure chamber 106.

The primary coil spring 123 is selected and the compression adjusting mechanism 124 is arranged so that when the differential pressure between the high and low pressure chambers 105, 106 corresponds to the pressure drop across a clean filter, the piston assembly 102 is fully extended outwardly by the force of the primary coil spring 123, as shown in FIG. 2. In this position, the N poles of the first and second magnetic assemblies 140, 141 are slightly inward from the N pole of the magnetic element 136 of the piston assembly 102. Thus, a significant inwardly directed axial component of magnetic force is exerted on the first and second magnetic assemblies 140, 141 by the magnetic element 136 of the piston assembly 102. Further, with the indicators 150, 164 at the inner limits, the first and second magnetic elements 142, 143 are closest to and, therefore, most strongly attracted to the first and second magnetic enhancers 144, 145, respectively. These inwardly directed magnetic forces acting on the first and second indicators 150, 164 securely and reliably maintain them in the non-signalling positions, i.e., at their inner limits, shown in FIG. 2, and prevent false actuation notwithstanding vibrations or mechanical shock or the gravitational orientation of the pressure indicating device 100.

As the differential pressure between the high and low pressure chambers 105, 106 increases, e.g., corresponding to an increase in the pressure drop across an increasingly clogged filter, the piston 104 is displaced inwardly within the housing bore 103 Movement of the piston shown in the accompanying drawings may be exaggerated for purposes of illustration. Thus, the magnetic element 136 of the piston assembly 102 is displaced inwardly with respect to the first and second magnetic assemblies 140, 141. In accordance with one aspect of the invention, at a first displacement corresponding to a first predetermined differential pressure level, the magnetic element 136 of the piston assembly 102 is sufficiently inward compared to the first magnetic element 142 that the axial component of magnetic force between them reverses direction, i.e., it becomes outwardly directed The magnetic element 136 of the piston assembly 102 and the first magnetic assembly 140 are arranged so this repulsive force between the magnetic element 136 of the piston assembly 102 and the first magnetic element 142 overcomes the attractive force between the first magnetic element 142 and the first magnetic enhancer 144. Thus, the first indicator 150 along with the first magnetic element 142 is urged outward along the cylindrical walls 160, 162 of the outward cylindrical projection 112, moving from the non-signalling position shown in FIG. 2 to the signalling position, i.e., to its outer limit, shown in FIG. 3 and by broken lines in FIG. 2.

Figure 3:
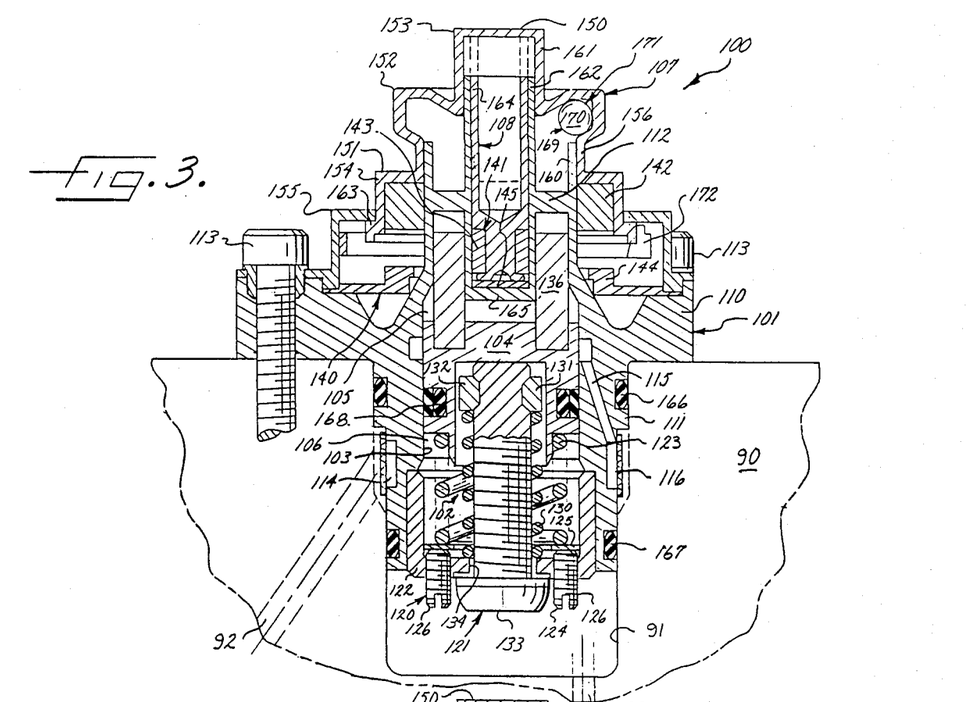
FIG. 3 is a sectional side view of the first pressure indicating device of FIG. 1 as viewed along lines 2—2 showing the first signalling mechanism in the signalling position and the second signalling mechanism in the non-signalling position.

However, further in accordance with this aspect of the invention, the magnetic element 136 of the piston assembly 102 at this first displacement is not sufficiently inward compared to the second magnetic element 143 for the axial component of magnetic force between them to reverse direction, i.e., it remains inwardly directed. Thus, the second indicator 164 remains in the non-signalling position within the interior cylindrical wall 162 of the outward cylindrical projection 112, as shown in FIGS. 2 and 3.

In the preferred mode of operation, the magnetic element 136 of the piston assembly 102 and the first and second magnetic assemblies 140, 141 are arranged so the first displacement, corresponding to the first predetermined differential pressure level, occurs within the distance of the gap 135 initially between the piston assembly 102 and the stop arrangement 131. In this manner, only the primary coil spring 123 is compressed during this first displacement and the differential pressure level corresponding to this first displacement may be independently varied simply by means of the compression adjusting mechanism 124 of the primary spring assembly 120.

While the repulsive forces between the magnetic element 136 of the piston assembly 102 and the first magnetic element 142 reliably maintain the first indicator 150 in the signalling position, the pressure indicating device 100 may also include a detent mechanism 169 which prevents the first indicator 150 from returning to the non-signalling position until it is reset. While the detent mechanism 169 may assume a variety of configurations, in the first exemplary pressure indicating device 100 it comprises a detent ball 170 disposed within an annular cavity 171 in the second tier 152 of the first indicator 150. In the contemplated application, the pressure indicating device 100 is mounted to the manifold 90 such that the first indicator 150 is gravitationally oriented in a downward direction, i.e., the third tier 153 is the lowest tier. As long as the first indicator 150 remains in the non-signalling position, the detent ball 170 remains in the chamber of the annular cavity 171 between the interior and exterior cylindrical walls 162, 160 of the outward cylindrical projection 112, as shown in FIG. 2. However, once the first indicator 150 moves to the signalling position, the detent ball 170 rolls into the outer chamber of the annular cavity 171 and remains there due to the gravitational forces acting on the ball 170. With the ball 170 in this position, the first indicator 150 is prevented from returning to the non-signalling position since the detent ball 170 blocks further advance of the exterior cylindrical wall 160 into the annular cavity 171.

The detent mechanism 169 may be reset by removing the component in which the indicator is mounted, e.g., a filter bowl, from the manifold and then inverting the device 100. The detent ball 170 will roll back into the chamber of the annular cavity 171 adjacent the interior cylindrical wall 162, allowing the first indicator 150 to be returned to the non-signalling position Because the pressures in the high and low pressure chambers 105, 106 are equalized by removing the pressure indicating device 100 from the manifold bore 91, the piston 104 is moved toward the cylindrical projection 112 by the primary coil spring 123. Consequently, the first indicator 150 will remain in the non-signalling position by the magnetic interaction between the first magnetic element 142, the first magnetic enhancer 144, and the magnetic element 136 of the piston assembly 102. With the first indicator 150 in its non-signalling position, the filter bowl and the pressure indicating device 100 may be returned to the manifold after cleaning or replacing the dirty filter element.

The pressure indicating device 100 may also include several other features. The side wall 154 of the first tier 151 may have a distinctly noticeable color, e.g., orange, to indicate strikingly when the first indicator 150 is in the signalling position. To provide an electrical as well as a mechanical indication that the first indicator 150 is in the signalling position, the pressure indicating device 100 may also include a Hall effect or reed switch (not shown) mounted proximate either the magnetic element 136 of the piston assembly 102 or the first magnetic element 142. This switch would then be actuated by the movement of the appropriate magnetic element 136, 142.

Further, the pressure indicating device 100 may also include a thermal lock-out mechanism 172 which prevents the first indicator 150 from moving to the signalling position when the first predetermined differential pressure level may be reached due to an increase in fluid viscosity at low temperatures. For example, the thermal lock-out mechanism 172 may comprise a arcuate bimetallic strip disposed between the cover 155 and the side wall 154 of the first tier 151 of the first indicator 150. The strip may be joined at one end to the cover 155 and arranged to bend towards the side wall 154 with decreasing temperature. Thus at a discrete temperature, when the viscosity of the fluid itself might account for the first differential pressure across the filter element, the strip is sufficiently bent toward the side wall 154 to catch the flange 163 and prevent the first indicator 150 from moving outwardly to the signalling position.

With the first indicator 150 in the signalling position, as the differential pressure between the high and low pressure chambers 105, 106 continues to increase, the piston 104 continues to be displaced inwardly within the housing bore 103, and the magnetic element 136 of the piston assembly 102 is further displaced inwardly with respect to the second magnetic assembly 141. In accordance with another aspect of the invention, at a second displacement corresponding to a second predetermined differential pressure level, the magnetic element 136 of the piston assembly 102 is sufficiently inward compared to the second magnetic element 143 that the axial component of magnetic force between them reverses direction, i.e., it becomes outwardly directed. The magnetic element 136 of the piston assembly 102 and the second magnetic assembly 141 are arranged so that this repulsive force between the magnetic element 136 of the piston assembly 102 and the second magnetic element 143 overcomes the attractive force between the second magnetic element 143 and the second magnetic enhancer 145. Thus, with this second displacement, the second indicator 164 along with the second magnetic element 143 is forced outward along the interior cylindrical wall 162 of the outward cylindrical projection 112, moving from the non-signalling position shown in FIG. 3 to the signalling position shown in FIG. 4 and by broken lines in FIG. 3.

Figure 5:
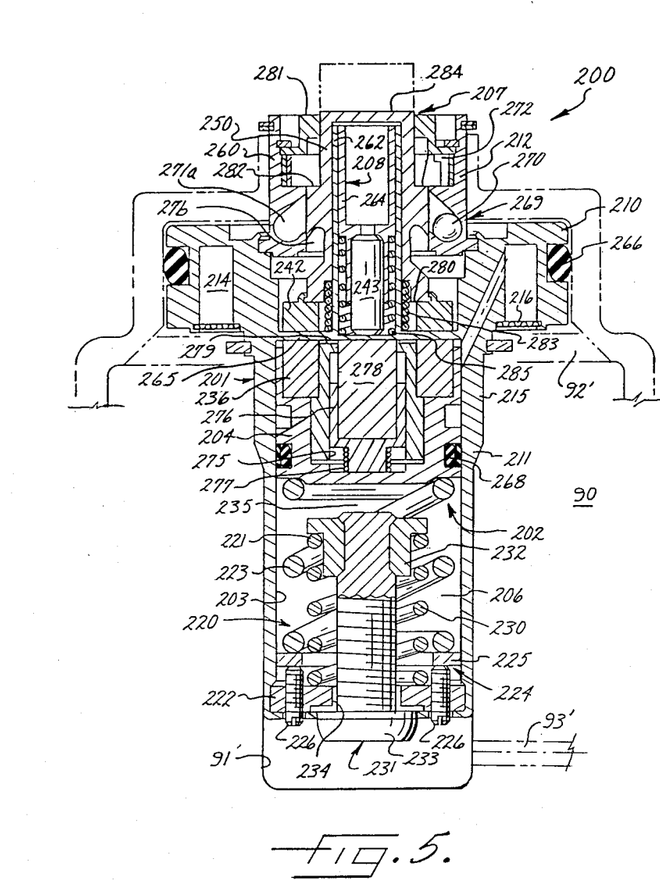
FIG. 5 is a sectional side view of a second exemplary pressure indicating device embodying the present invention showing the first and second signalling mechanisms in the non-signalling positions.

In the preferred mode of operation, the magnetic element 136 of the piston assembly 102 and the second magnetic assembly 141 are arranged so that the second displacement occurs after the piston 204 has moved into the high pressure chamber 205. Meanwhile, fluid from the low pressure duct 93' fills the inward end of the manifold bore 91' and passes under the head of the bolt 233, through the aperture 234 in the retainer 222, and into the low pressure chamber 206. When the differential pressure between the high and low pressure chamber 205, 206 corresponds to a clean or unobstructed filter element, the piston assembly 202 is fully extended outwardly by the force of the primary coil spring 223, as shown in FIG. 5. In this position, the magnetic elements 236, 278 of the piston assembly 202 are closest to and, therefore, most strongly attracted to the magnetic elements 242, 243 of the first and second signalling mechanisms 207, 208, respectively. Thus, significant inwardly directed axial components of magnetic forces are exerted on the first and second magnetic elements 242, 243. These inwardly directed magnetic forces are sufficient to overcome the outwardly directed forces of the coil springs 283, 285 of the first and second signalling mechanisms 207, 208. Thus, the first and second indicators 250, 264 are securely and reliably maintained in the non-signalling positions shown in FIG. 5 notwithstanding vibrations or mechanical shock or the gravitational orientation of the pressure indicating device 200.

As the differential pressure between the high and low pressure chambers 205, 206 increases, the piston 204 is forced inwardly within the housing bore 203. In accordance with another aspect of the invention, the magnetic element 236 on the piston 204 is displaced inwardly with respect to the magnetic element 242 of the first signalling mechanism 207. At a first displacement corresponding to a first predetermined differential pressure level, the magnetic element 236 on the piston 204 is sufficiently inward from the first magnetic element 242 that the attractive force between them is not sufficient to overcome the outwardly directed force of the coil spring 283 between the first indicator 250 and the separator wall 265. Consequently, the first indicator 250 along with the first magnetic element 242 is forced outward between the cylindrical walls 260, 262 of the outward cylindrical projection 212, moving from the non-signalling position shown in FIG. 5 to the signalling position shown in FIG. 6 and by broken lines in FIG. 5.

Figure 6:
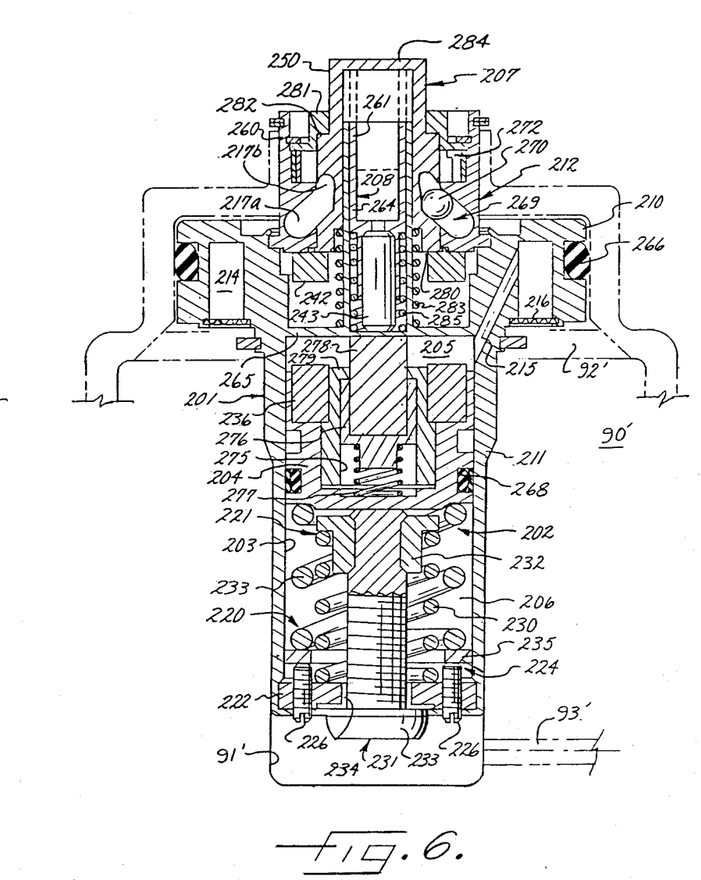
FIG. 6 is a sectional side view of the second pressure indicating device of FIG. 5 showing the first signalling mechanism in the signalling position and the second signalling mechanism in the non-signalling position.

However, further in accordance with this aspect of the invention, due to the outwardly directed force of the coil spring 277 on the slide 276 and the attractive forces between the magnetic element 278 on the slide 276 and the magnetic element 243 of the second signalling mechanism 208, the magnetic element 278 on the slide 276 remains adjacent the separator wall 265 while the piston 204 and the magnetic element 236 on the piston 204 move inwardly through the first displacement. Thus, the attractive forces between the magnetic element 278 on the slide 276 and the second magnetic element 243 retain the second indicator 264 in the non-signalling position within the interior cylindrical wall 262 of the outward cylindrical projection 212, as shown in FIGS. 5 and 6.

In the preferred mode of operation, the primary coil spring 223, the magnetic element 236 on the piston 204, and the magnetic element 242 and the coil spring 283 of the first signalling mechanism 207 are arranged so the first displacement corresponding to the first predetermined pressure level again occurs within the distance of the gap 235 intially between the piston 204 and the stop arrangement 231. In this manner, only the primary coil spring 223 is compressed during the first displacement and the level of the differential pressure corresponding to this first displacement may be varied simply by means of the compression adjusting mechanism 224 of the primary spring assembly 220.

The second pressure indicating device 200 also includes a detent mechanism 269 with a detent ball 270. Again, in the contemplated application, the device 200 is mounted on the manifold 90' such that the first indicator 250 is gravitationally oriented in a downward direction. As long as the first indicator 250 remains in the non-signalling position, the detent ball 270 remains in an annular cavity 271a in the exterior cylindrical wall 260 of the outward cylindrical projection 212 of the housing 201, as shown in FIG. 5. However, the first indicator 250 includes an annular cavity 271b which aligns with the annular cavity 271a in the exterior cylindrical wall 260 when the first indicator 250 moves to the signalling position, allowing the detent ball 270 to roll between the first indicator 250 and the exterior cylindrical wall 262. With the ball 270 in this blocking position, the first indicator 250 is prevented from returning to the non-signalling position.

The second pressure indicating device 200 may also includes a thermal lock-out mechanism 272 similar to that of the first pressure indicating device. However, the thermal lock-out mechanism 272 may be disposed between the exterior cylindrical wall 262 and the first indicator 250. The arcuate bimetallic strip is attached at one end to the exterior cylindrical wall 260 and arranged to bend toward and catch the ledge 282 on the first indicator 250 at a predetermined temperature.

With the first indicator 250 in the signalling position, as the difference in pressures between the high and low pressure chambers 205, 206 continues to increase, the piston 204 continues to be displaced inwardly within the housing bore 203 and with respect to the slide 276. In accordance with another aspect of the invention, once the lip 279 of the piston 204 contacts the slide 276, the magnetic element 278 on the slide 276 is displaced inwardly with respect to the magnetic element 243 of the second signalling mechanism 208 as the piston 204 is urged further inward within the housing bore 203. At a second displacement corresponding to a second predetermined differential pressure level, the magnetic element 278 on the slide 276 is sufficiently inward from the second magnetic element 243 that the attractive force between them is not sufficient to overcome the outwardly directed force of the coil spring 285 between the second indicator 264 and the separator wall 265. Consequently, at this second displacement, the second indicator 264 along with the second magnetic element 243 is forced outward along the interior cylindrical wall 262 of the outward cylindrical projection 212, moving from the non-signalling position shown in FIG. 6 to the signalling position shown in FIG. 7 and by the broken lines in FIG. 6.

In the preferred mode of operation, the distance the slide 276 travels within the piston bore 275 equals the distance of the gap 235 initially between the piston 204 and the stop arrangement 231. Further, the magnetic element 278 on the slide 276 and the magnetic element 243 and the coil spring 285 of the second signalling mechanism 208 are arranged so that the second displacement occurs after the piston 204 has moved through the distance of the gap 235. In this manner, both the primary and secondary coil springs 223, 230 are compressed but the predetermined level of the difthrough the distance of the gap 135 initially between the piston 104 and the stop arrangement 131. In this way, both the primary and secondary coil springs 123, 130 are compressed but the differential pressure level corresponding to this second displacement may be independently varied simply by varying the compression of the secondary coil spring 130 by means of the stop arrangement 131 of the secondary spring assembly 121.

Figure 4:
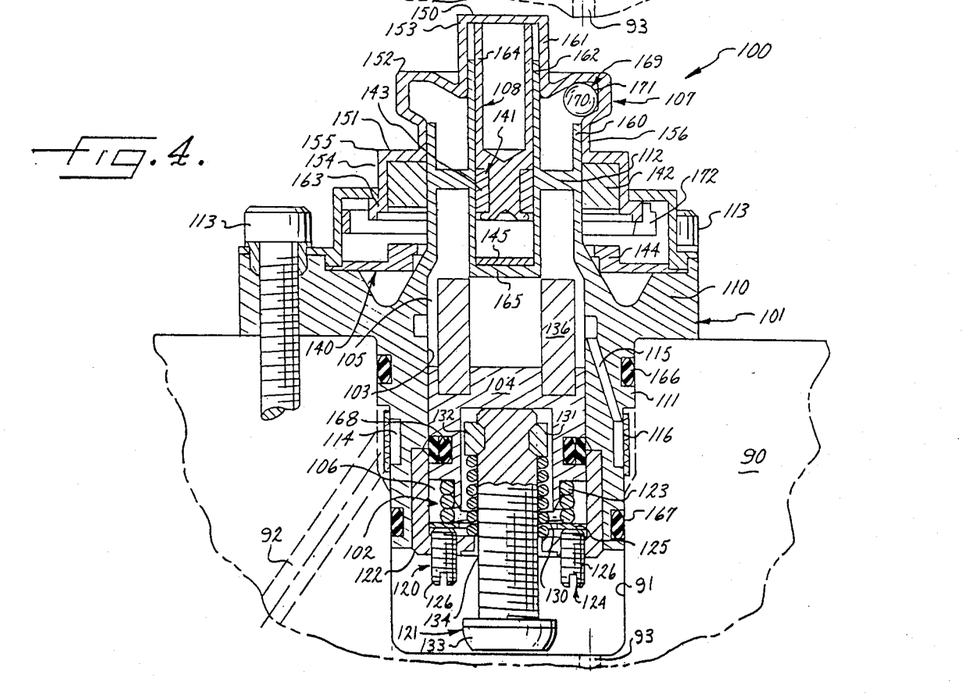
FIG. 4 is a sectional side view of the first pressure indicating device of FIG. 1 as viewed along lines 2—2 showing the first and second signalling mechanisms in the signalling positions.

Once the second indicator 164 moves to the signalling position, it is maintained in that position by the repulsive forces between the magnetic element 136 of the piston assembly 102 and the second magnetic element 143. To indicate clearly that the second indicator 164 is in the signalling position, the third tier 153 of the first indicator 150 has two windows cut into it with a narrow band across the top and the exterior of the second indicator 164 preferably has a distinctively noticeable color, e.g., red. Again, a Hall effect or reed switch (not shown) may be mounted proximate the magnetic element 136 of the piston assembly 102 or the second magnetic element 143 to provide an electrical indication that the second signalling element 164 is in the signalling position. Further, a detent mechanism (not shown) may be provided for preventing the second indicator 164 from returning to the non-signalling position.

In FIG. 5, a second exemplary pressure indicating device 200 is also shown as a discrete component mounted to a manifold 90' within a manifold bore 91' and communicating with high and low pressures ducts 92', 93'. Similar to the first pressure indicating device 100, the second pressure indicating device 200 comprises a housing 201, a piston assembly 202 and first and second signalling mechanisms 207, 208 magnetically coupled to the piston assembly 202 for indicating when the differential pressure exceeds first and second predetermined levels, respectively. (Corresponding elements of the first and second pressure indicating devices 100, 200 are identified by reference numerals having the same last two digits.)

However, the second pressure indicating device 200 differs from the first pressure indicating device 100 in several important respects. The plate portion 210 of the housing 201 includes an annular cavity 214 with a passageway 215 to channel the high pressure fluid from the high pressure duct 92' to the high pressure chamber 205. A suitable filter 216 may be disposed between the annular cavity 214 and the high pressure duct 92' to remove particulates carried by the fluid and which are larger than a specific size. A circumferential seal 266 disposed between the plate chamber 210 of the housing 201 and the manifold 90' prevents leakage of the fluid from the manifold 90'.

The piston assembly 202 includes a piston 204 and a magnetic element 236 fixedly attached to the piston 204. The piston has a central bore 275 and the magnetic element 236, which has an annular cross section, is coaxially mounted to the piston 204 about the piston bore 275. The piston assembly 202 further includes a slide arrangement comprising a slide 276, a coil spring 277, and a cylindrical magnetic element 278. The slide 276 is disposed within the piston bore 275, traversing the bore 275 between an inner limit defined by the intersection of the slide 276 and the piston 204 and an outer limit defined by the intersection of the slide 276 and a lip 279 of the piston 204 overhanging the piston bore 275. Positioned between the slide 276 and the piston 204, the coil spring 277 biases the slide 276 outward of the manifold 90' and toward the lip 279. The cylindrical magnetic element 278 is fixedly and coaxially mounted to the head of the slide 276, projecting outward beyond the lip 279 of the piston 204.

The first and second signalling mechanisms 207, 208 are magnetically coupled through the separator wall 265 of the housing 201 to the piston assembly 202. In accordance with another aspect of the invention, the first signalling mechanism 207 includes an annular magnetic element 242 coaxially disposed on the opposite side of the separator wall 265 from the annular magnetic element 236 on the piston 204. Similarly, the second signalling mechanism 208 includes a cylindrical magnetic element 243 coaxially disposed on the opposite side of the separate wall 265 from the cylindrical magnetic element 278 on the slide 276. In the preferred embodiment, all of the magnetic elements 236, 242, 243, 278 are permanent magnets fashioned from rare earth materials; the field within each magnetic element 236, 242, 243, 278 is generally aligned axially; and the poles of the magnetic elements 236, 242, 243, 278 are oriented so that opposite poles are in face-to-face relation across the separator wall 265. In an alternative embodiment, either one of the annular magnetic elements 236, 242 or either one of the cylindrical magnetic elements 243, 278 may be fashioned from a magnetic material rather than a permanent magnet.

In addition to the first magnetic element 242, the first signalling mechanism 207 includes a hollow, generally cylindrical indicator 250 disposed between the exterior and interior cylindrical walls 260, 262 of the outward cylindrical projection 212 of the housing 201. The first magnetic element 242 is fixedly attached to this first indicator 250 about an inward open end 280 of the indicator 250. Thus, the first indicator 250 may slide between the cylindrical walls 260, 262 between an inner limit defined by the intersection of the first magnetic element 242 and the separator wall 265 and an outer limit defined by the intersection of a lip 281 on the exterior cylindrical wall 260 and a ledge 282 on the first indicator 250. The first signalling mechanism 207 also includes a coil spring 283 disposed about the interior cylindrical wall 262 between the first indicator 250 and the separator wall 265. The coil spring 283 biases the first indicator 250 toward its outer limit.

The second signalling mechanism 208 includes, in addition to the second magnetic element 243, a hollow cylindrical indicator 264 disposed coaxially within and adjacent the interior cylindrical wall 262 of the outward cylindrical projection 212. This second indicator 264 is fixedly attached to the second magnetic element 243 and together with the second magnetic element 243 extends from the separator wall 265 to the top of the interior cylindrical wall 262. With the first indicator 250 at its inner limit, the second indicator 264 is confined within the interior cylindrical wall 262 by a narrow band 284 of the first indicator 250. However, with the first indicator 250 at its outer limit, the second indicator 264 may slide outward to an outer limit defined by the intersection of the second indicator 264 and the outer narrow band 284 of the first indicator 250. The second signalling mechanism 208 also includes a coil spring 285 disposed between the separator wall 265 and the second indicator 264. The coil spring 285 biases the second indicator 264 toward its outer limit.

The preferred mode of operation of the second pressure indicating device 200 is as follows. Fluid from the high pressure duct 92' passes through the filter 216, into the annular cavity 214, along the passageway 215, and ferential pressure corresponding to this second displacement may be varied simply by varying the compression of the secondary coil spring 230 by means of the stop arrangement 232 of the secondary spring assembly 221.

Figure 7:
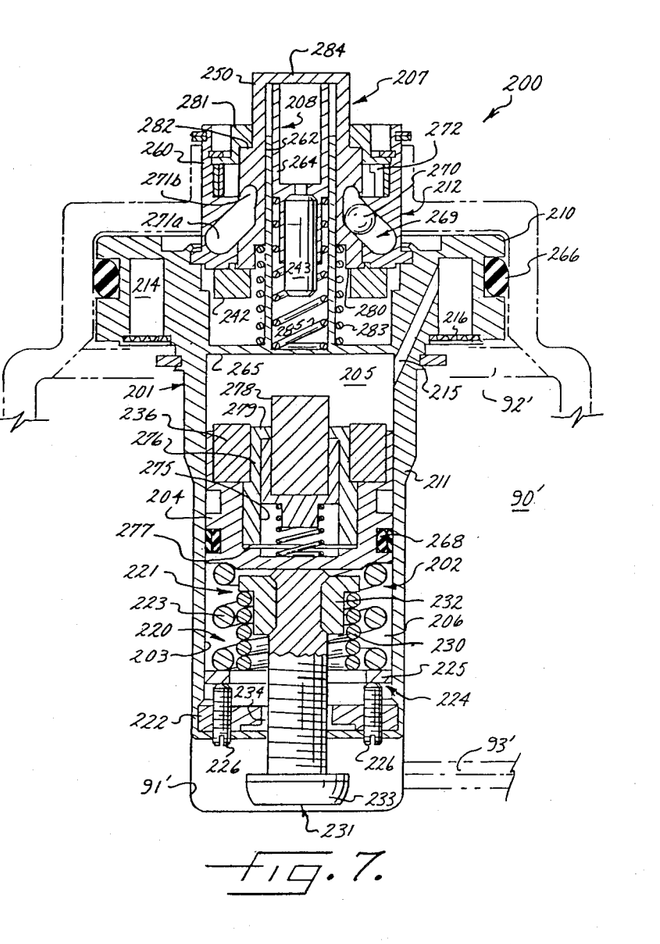
FIG. 7 is a sectional side view of the second pressure indicating device of FIG. 5 showing the first and second signalling mechanisms in the signalling positions.

Once the second indicator 264 moves to the signalling position, it is maintained in that position by the outwardly directed force of the coil spring 285 of the second signalling mechanism 208. To indicate clearly that the second indicator 264 is in the signalling position, the outward chamber of the first indicator 250 has two windows cut into it with a narrow band across the top and the exterior of the second indicator 264 preferably has a distinctively noticeable color.

Similar to the first pressure indicating device 100, the second pressure indicating device 200 may also include Hall effect or reed effect switches to provide an electrical as well as mechanical indication of the signalling positions of the first and second signalling mechanisms 207, 208. Further, a detent mechanism (not shown) may be provided for preventing the second indicator 264 from returning to the non-signalling position.

Figure 8:
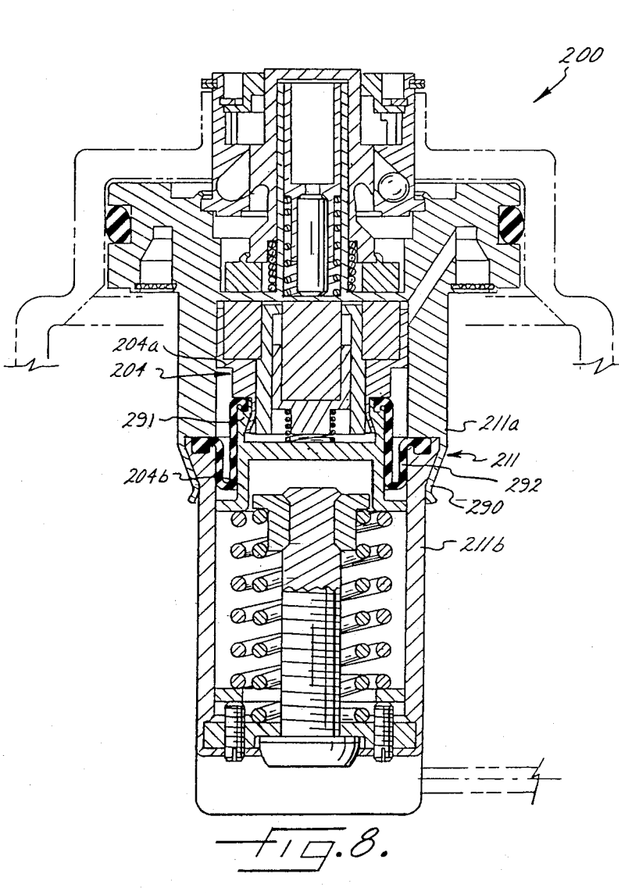
FIG. 8 is a sectional side view of a modification of the second pressure indicating device of FIG. 5.

In FIG. 8, a modification of the second exemplary pressure indicating device 200 is shown. The inward cylindrical projection 211 comprises first and second portions 211a, 211b joined by an annular clamp arrangement 290. The piston 204 is similarly comprised of first and second portions 204a, 204b joined by another annular clamp arrangement 291. An annular flexible rolling seal 292 is clamped at its exterior edge between the first and second chambers 211a, 211b of the inward cylindrical projection 211 and at its interior edge between the first and second portions 204a, 204b of the piston 204. With these exceptions, the modified second pressure indicating device 200 shown in FIG. 8 is constructed and operated in a manner virtually identical to that of the second pressure indicating device 200 of FIGS. 5-7.

Figure 9:
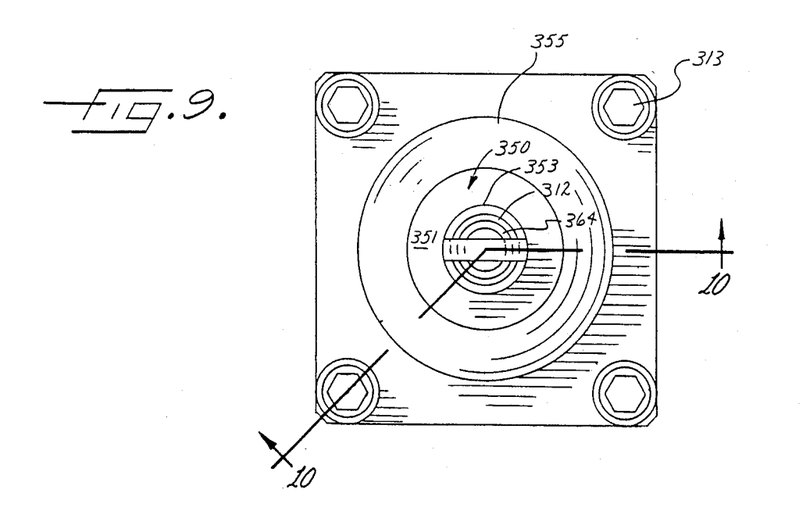
FIG. 9 is a plan view of a third exemplary pressure indicating device embodying the present invention.
Figure 10:
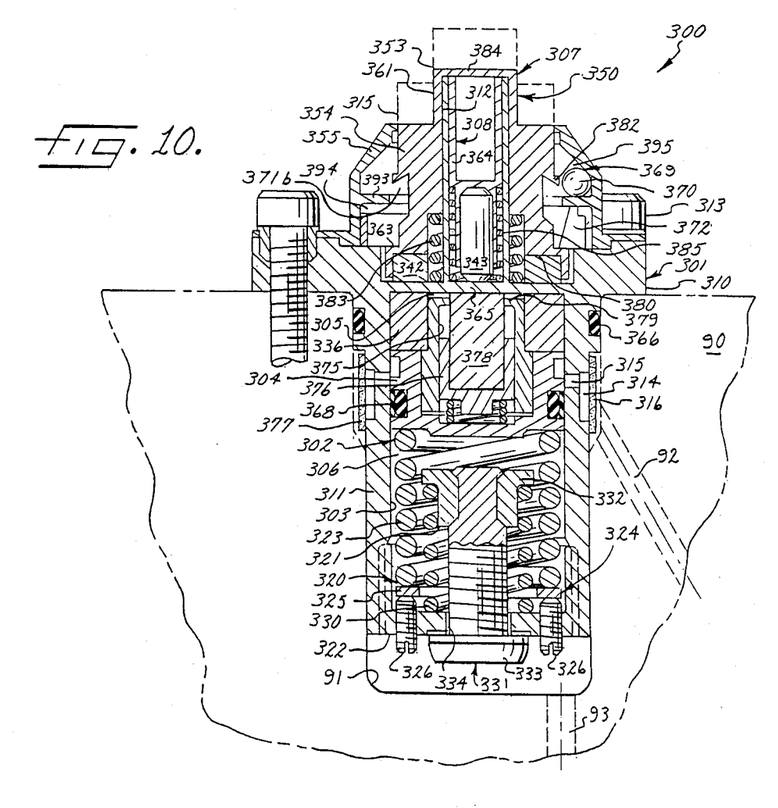
FIG. 10 is a sectional side view of the third pressure indicating device of FIG. 9 as viewed along lines 10—10 showing the first and second signalling mechanisms in the non-signalling positions.

In FIGS. 9 and 10, a third exemplary pressure indicating device 300 is again shown as a discrete component mounted to a manifold 90 within a manifold bore 91 and communicating with high and low pressure ducts 92, 93. The third pressure indicating device 300 comprises a housing 301 having an inward cylindrical projection 311 similar to that of the first pressure indicating device 100. It further comprises a piston assembly 302 and first and second signalling mechanisms 307, 308 similar to those of the second pressure indicating device 200. (Corresponding elements of the first, second and third pressure indicating devices 100, 200, 300 are identified by reference numerals having the same last two digits.)

The third pressure indicating device 300 differs from the first and second pressure indicating devices 100, 200 in several respects. The indicator 350 of the first signalling mechanism 307 comprises two generally cylindrical tiers 351, 353. The side wall 354 of the first tier 351 is disposed within a circular aperture in the cover 355. The side wall 361 is disposed between both tiers 351 and 353 and is also disposed about the outward cylindrical projection 312. Thus, the first indicator 350, which is fixedly attached to the first magnetic element 342, may slide along the outward cylindrical projection 312 between an outer limit defined by the intersection of the cover 355 and a ledge 382 on the side wall 354 of the first tier 351 and an inner limit defined by the intersection of the first magnetic element 342 and the separator wall 365 of the housing 301.

The cover 355, which is axially symmetric and disposed coaxially about the first indicator 350, includes an interiorly projecting lip 393 that divides the space between the cover 355 and the first indicator 350 into inner and outer annular cavities 394, 395. The inner cavity 394 contains the thermal lock-out mechanism 372. The arcuate bimetallic strip is attached at one end to the cover 355 and is arranged to bend toward and catch a flange 363 on the first indicator 350 at a predetermined temperature.

The outer annular cavity 395 contains the detent ball 370. Again, in the contemplated application, the third pressure indicating device 300 is mounted to the manifold 90 such that the first indicator 350 is gravitationally oriented in a downward direction. As long as the first indicator 350 remains in the non-signalling position, the detent ball 370 remains in the outer cavity 395 proximate the cover 355. However, once the first indicator 350 moves to the signalling position, the detent ball 370 rolls into an annular cavity 371b in the side wall 354 of the first tier 351. The first indicator 350 is then prevented from returning to the non-signalling position because the detent ball 370 engages the interiorly projecting lip 393 of the cover 355.

The third pressure indicating device 300 operates in a manner virtually identical to that of the second pressure indicating device 200.

Although the invention has been described in terms of several exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as defined by the claims.

I claim:

1. A device for sequentially indicating at least two differential pressures between first and second pressure sources comprising:

a housing having a bore;

a piston member slidably disposed within the bore and dividing the bore into first and second chambers, said piston member including permanent magnet means and said housing including means for connecting the first pressure source to the first chamber and means for connecting the second pressure source to the second chamber whereby the piston member is displaceably responsive to differences in pressure between the first and second pressure sources;

spring means operatively associated with the piston member for opposing movement of the piston member from a first, normal position to a second position when the pressure differential between the first and second pressure sources is above a first predetermined differential pressure level, and from said second position to a third position when the pressure differential is above a second predetermined differential pressure level;

signalling means in cooperative arrangement with the piston member for indicating at least said first and second differential pressure levels, said signalling means including first indicator means magnetically coupled to the piston permanent magnet means for moving from a non-signalling to a signalling position in response to a displacement of the piston member from the first to the second positions, and second indicator means magnetically coupled to the piston permanent magnet means for moving from a non-signalling to a signalling position in response to a displacement of the piston member from the second to the third positions, the first and second indicator means being axially symmetric and slidably mounted to the housing with one being coaxially disposed around the other, the piston permanent magnet means being axially symmetric and disposed coaxially with respect to the first and second indicator means.

2. The pressure indicating device of claim 1 wherein the first indicator means includes an indicator slidably mounted to the housing and second permanent magnet means attached to the indicator and magnetically coupled to the piston permanent magnet means, said second permanent magnet means being repelled by the piston permanent magnet means from a non-signalling position to a signalling position in response to the displacement of the piston member from the first to the second position.

3. The pressure indicating device of claim 1 wherein at least one of the first and second indicator means includes an indicator slidably mounted to the housing, magnetic means attached to the indicator and magnetically coupled to the piston permanent magnet means, said indicator magnetic means being attractively maintained in a non-signalling position by the piston permanent magnet means when the piston member is in the first position, and spring means disposed between the housing and the indicator for urging the indicator from the non-signalling position to a signalling position in response to the appropriate displacement of the piston member.

4. The pressure indicating device of claim 3 wherein the indicator magnetic means and the piston permanent magnet means are axially symmetric with one coaxially disposed and axially spaced with respect to the other when the indicator means is in the non-signalling position and the piston member is in the first position.

5. The pressure indicating device of claim 1 wherein the spring means includes first and second spring assemblies, said first spring assembly continuously engaging the piston member and said second spring assembly spaced a predetermined distance from the piston member when the piston member is in the first position.

6. The pressure indicating device of claim 5 wherein the first displacement is less than the predetermined distance while the second displacement is greater than the predetermined distance and wherein the first and second spring assemblies each comprise a spring and means for adjusting the compression of the spring.

7. A device for sequentially indicating at least two differential pressures between first and second pressure sources comprising:
a housing having a bore;
a piston member slidably disposed within the bore and dividing the bore into first and second chambers, said piston member including a permanent magnet means and said housing including first means for connecting the first pressure source to the first chamber and second means for connecting the second pressure source to the second chamber whereby the piston member is displaceably responsive to differences in pressure between the first and second pressure sources;
spring means operatively associated with the piston member for opposing movement of the piston member from a first, normal position to a second position when the differential pressure between the first and second pressure sources is above a first predetermined level, and from said second position to a third position when the pressure differential is above a second predetermined level; and
first and second means for indicating said first and second pressure levels respectively, said first and second indicating means each including an indicator slidably mounted to the housing and first and second magnetic means attached to the respective indicators and magnetically coupled to the piston permanent magnet means, said first magnetic means being repelled by the piston permanent magnet means from a non-signalling position to a signalling position in response to a displacement of the piston from the first position to the second position and said second magnetic means being repelled by the piston permanent magnet means from a non-signalling position to a signalling position in response to a displacement of the piston member from the second position to the third position.

8. The pressure indicating device of claim 7 wherein the first and second magnetic means are magnetically maintained in the non-signalling positions by the piston permanent magnet means when the piston member is in the first position.

9. The pressure indicating device of claim 7 further comprising magnetic means attached to the housing and magnetically coupled to at least one of the first and second magnetic means for attractively maintaining said one magnetic means in the non-signalling position when the piston member is in the first position.

10. The pressure indicating device of claim 7 wherein the permanent magnet means and the magnetic means are axially symmetric and wherein the first magnetic means is disposed coaxially around the piston permanent magnet means while the piston permanent magnet means is disposed coaxially around the second magnetic means.

11. The pressure indicating device of claim 7 wherein the first and second indicators are axially symmetric with one coaxially disposed around the other.

12. The pressure indicating device of claim 7 where the spring means includes first and second spring assemblies, said first spring assembly continuously engaging the piston member and said second spring assembly spaced a predetermined distance from the piston member when the piston member is in the first position.

13. The pressure indicating device of claim 12 wherein the displacement from the first position to the second position is less than the predetermined distance and the displacement from the second position to the third position is greater than the predetermined distance and wherein the first and second spring assemblies each comprises a spring and means for adjusting the compression of the spring.

14. The pressure indicating device of claim 7 wherein the magnetic means are permanent magnets.

15. The pressure indicating device of claim 7 further comprising a detent means associated with one of the first and second indicating means for moving to a blocking position between the housing and the indicator when the indicator moves to the signalling position, whereby the indicator is prevented from returning to the non-signalling position.

16. The pressure indicating device of claim 7 further comprising a therma lock-out means associated with one of the first and second indicating means for moving at a predetermined temperature to a blocking position between the indicator and the housing when the indicator is in the non-signalling position, whereby the indicator is prevented from moving to the signalling position.

17. A device for indicating differential pressures between first and second pressure sources comprising:
- a housing having a bore;
- a piston member slidably disposed within the bore and dividing the bore into first and second chambers, said piston member including permanent magnet means and said housing including means for connecting the first pressure source to the first chamber and means for connecting the second pressure source to the second chamber whereby the piston member is displaceably responsive to differences in pressure between the first and second pressure sources;
- spring means operatively associated with the piston member for opposing movement of the piston member from a first, normal position to a second position when the differential pressure between the first and second pressure sources is above a first predetermined level, and from said second position to a third position when the pressure differential is above a second predetermined level; and
- signalling means in cooperative arrangement with the piston member for indicating said first and second differential pressures respectively, said signalling means including first and second indicators slidably mounted to the housing, first and second magnetic means respectively attached to the first and second indicators and magnetically coupled to the piston permanent magnet means, said first and second magnetic means being attractively maintained in non-signalling positions by the piston permanent magnet means when the piston member is in the first position, first spring means disposed between the housing and the first indicator for biasing the first indicator from the non-signalling position to a signalling position in response to a displacement of the piston member from the first position to the second position, and second spring means disposed between the housing and the second indicator for urging the second indicator from the non-signalling position to a signalling position in response to a displacement of the piston member from the second position to the third position;

18. The pressure indicating device of claim 17 wherein all magnetic means are axially symmetric and wherein the first and second magnetic means are coaxially disposed and axially spaced with respect to the piston magnetic means when the piston member is in the first position and the first and second magnetic means are in the non-signalling position.

19. The pressure indicating device of claim 17 wherein the first and second indicators are axially symmetric with one coaxially disposed around the other.

20. The pressure indicating device of claim 17 wherein the piston permanent magnet means includes first and second permanent magnet elements disposed adjacent and axially spaced from the first and second magnetic means, respectively, when the piston member is in the first position and the first and second magnetic means are in the non-signalling positions.

21. The pressure indicating device of claim 20 wherein the piston member includes a piston having a central bore opening into the first pressure chamber and further includes a slide disposed within the piston bore and spring means disposed between the slide and the piston for biasing the slide away from the piston, wherein the first permanent magnet element comprises an annular permanent magnet element mounted to the piston around the piston bore and the second permanent magnet element is mounted to the slide, and wherein the first magnetic means comprises an annular magnetic element and the second magnetic means comprises a magnetic element disposed coaxially within the first magnetic means.

22. The pressure indicating device of claim 17 wherein the spring means includes first and second spring assemblies, said first spring assembly continuously engaging the piston member and said second spring assembly being spaced a first predetermined distance from the piston member when the piston member is in the first position.

23. The pressure indicating device of claim 22 wherein the first displacement is less than the first predetermined distance and the second displacement is greater than the first predetermined distance and wherein the first and second spring assemblies each comprise a spring and means for adjusting the compression of the spring.

24. The pressure indicating device of claim 23 wherein the piston member includes a piston having a central bore opening into the first pressure chamber and further includes a slide disposed within the piston bore, spring means disposed between the slide and piston for biasing the slide away from the piston, and lip means projecting from the piston for limiting the travel of the slide to a second predetermined distance equal to the first predetermined distance and wherein the piston permanent magnet means includes a first annular permanent magnet element mounted to the piston about the piston bore and a second permanent magnet element mounted to the slide, said first and second permanent magnet elements disposed adjacent and spaced axially from the first and second magnetic means, respectively, when the piston member is in the first position and the first and second magnetic means are in the non-signalling position.

25. The pressure indicating device of claim 17 further comprising detent means associated with one of the first and second indicating means for moving to a blocking position between the indicator and the housing when the indicator moves to the signalling position, whereby the indicator is prevented from returning to the non-signalling position.

26. The pressure indicating device of claim 17 further comprising thermal lock-out means associated with one of the first and second indicating means for moving at a predetermined temperature to a blocking position between the indicator and the housing when the indicator is in the non-signalling position, whereby the indicator is prevented from moving to the signalling position.

27. A device sequentially responsive to at least two differential pressures between first and second pressure sources comprising first, second and third axially symmetric permanent magnets, the third permanent magnet magnetically coupled to the first and second permanent magnets; means for slidably supporting the permanent magnets such that, in an initial position, the first permanent magnet is coaxially disposed around the third permanent magnet and the second permanent magnet is coaxially disposed within the third permanent magnet; and means connected to the third permanent magnet for translating changes in differential pressure into changes in axial displacement of the third permanent magnet relative to the first and second permanent magnets whereby at a first displacement the resultant axial component of force between the first and third permanent magnets reverses direction and at a second different displacement the resultant axial component of force between the second and third permanent magnets reverses direction.

28. The pressure indicating device of claim 1 wherein the second indicator means includes an indicator slidably mounted to the housing and second permanent magnet means attached to the indicator and magnetically coupled to the piston permanent magnet means, said second permanent magnet means being repelled by the piston permanent magnet means from a non-signalling position to a signalling position in response to the displacement of the piston members from the second to the third positions.

* * * * *

UNITED STATES PATENT AND TRADEMARK OFFICE
CERTIFICATE OF CORRECTION

PATENT NO. : 4,651,670

DATED : March 24, 1987

INVENTOR(S) : Bernard Silverwater

It is certified that error appears in the above-identified patent and that said Letters Patent is hereby corrected as shown below:

In the Specification:

Col. 6, l. 59, after "rected" insert a period

Col. 7, l. 62, after "position" insert a period

In the Claims:

Claim 16, Col. 16, l. 66, delete "therma" and substitute --thermal--

Signed and Sealed this

Twenty-second Day of December, 1987

Attest:

DONALD J. QUIGG

Attesting Officer     Commissioner of Patents and Trademarks